United States Patent [19]

Yang

[11] Patent Number: 4,697,777
[45] Date of Patent: Oct. 6, 1987

[54] SWIVEL CANOPY

[76] Inventor: Tai-Her Yang, 5-1 Taipin St., Si-Hu Town, Dzan-Hwa, Taiwan

[21] Appl. No.: 892,295

[22] Filed: Aug. 4, 1986

[51] Int. Cl.⁴ .............................................. F16M 1/00
[52] U.S. Cl. .................................. 248/343; 248/542; 248/544
[58] Field of Search .......................... 248/342–345, 248/324, 317, 320, 321, 326, 333, 231.8, 316.7, 544, 542, 343; 362/418, 419, 285, 404

[56] References Cited

U.S. PATENT DOCUMENTS

| 481,814 | 8/1892 | Overholt | 248/333 |
| 690,113 | 12/1901 | Leggatt | 248/326 |
| 943,299 | 12/1909 | Corson | 248/342 |
| 1,059,441 | 4/1913 | Crowell | 248/344 |

Primary Examiner—Reinaldo P. Machado
Assistant Examiner—A. Chin-Shue
Attorney, Agent, or Firm—Leonard Bloom

[57] ABSTRACT

A swivel canopy for hanging electrical fixtures is disclosed having means whereby the installation of the canopy can be tested prior to use in order to insure that it has been properly installed and that it will supply the requisite support and stability during the use thereof. The means provided is comprised of a substantially U-shaped resiliently, outwardly biased spring member which is disposed through the suspension conduit. In a preferred embodiment, the means provided is comprised of a pair of arcuately-shaped, resiliently-outwardly biased spring retainers which are diametrically positioned about the suspension conduit.

2 Claims, 4 Drawing Figures

SWIVEL CANOPY

CROSS REFERENCE TO RELATED APPLICATION

The present application is a further improvement on my co-pending application entitled "Swivel Canopy for Hanging Electrical Fixtures", Ser. No. 875,201, filed June 17, 1986, now abandoned.

FIELD OF THE INVENTION

The present invention relates to swivel canopies for hanging electrical fixtures and, in particular, to a swivel canopy which is provided with means for test the installation of the canopy before the use thereof to insure that it will supply the requisite support and stability.

BACKGROUND OF THE INVENTION

Swivel canopies for hanging electrical fixtures are secured to a ceiling and support the entire weight of the said hanging electrical fixture. During the operation of these fixtures, such as a ceiling fan, events such as vibrations, swinging etc., are often produced which provide additional stress to which the swivel canopy is subjected. This additional stress can result in damage to the fixture and/or can result in the canopy becoming unsecured should the canopy not be properly installed. The swivel canopies of the prior art, of which I am aware, do not provide for any means whatsoever wherein an individual installing such canopy can properly test, or subject the canopy to pressure or stress, so as to insure that it has been properly installed so that it will support the fixture during use thereof.

Thus, it will be appreciated that there remains a need for a swivel canopy for a hanging electrical fixture, such as a ceiling fan, which can be tested prior to use in order to insure that it has been properly installed and that it will supply the requisite support and stability.

SUMMARY OF THE INVENTION

Accordingly, it is the primary objective of the present invention to alleviate the disadvantages and deficiencies of the prior art by providing a swivel canopy for a hanging electrical fixture which can be tested prior to use in order to insure that it has been properly installed and that it will supply the requisite support and stability during the use thereof.

In accordance with the teachings of the present invention, there is provided a swivel canopy for electrical fixtures of the type having at least two upper mounting flanges; means for suitably securing said flanges to a ceiling. At least two downwardly converging legs are provided. Each leg has an upper portion being integral with one of the flanges. Each leg further has a lower portion. A spherical retaining surface is integral with the lower portion of said legs. Said surface has a vertical bore formed therethrough defining the zone of a sphere. A swivel member has at least one keyway formed thereon. Said swivel member is supported at the inner periphery of the spherical retaining surface. A hollow suspension conduit has an upper portion having the swivel member suitably secured thereto, and a lower portion for supporting an electrical fixture thereon for suspension below the retaining surface. At least one key is formed on said retaining surface for cooperating with the keyway. Said key is substantially circular in shape, being positioned on the retaining surface contacting the center of gravity of the swivel ball, wherein the swivel ball is substantially hemispherically supported by the key and the retaining surface. The improvement thereupon comprises said suspension conduit having a pair of apertures formed therein, being positioned diametrically about the conduit and in substantial horizontal alignment with one another. Said suspension conduit is further provided with a third aperture formed therein being positioned substantially equidistantly between the pair of diametrically positioned apertures on a plane being substantially horizontal therewith. A substantially U-shaped resiliently, outwardly biased spring member having a first end and a second end is disposed through each of the diametrically positioned apertures so that said first end and said second end of the spring member emerges from a respective aperture and extend upwardly therefrom towards the ceiling. A substantially circular roll pin is horizontally disposed through the third aperture being received within the conduit in a position above the spring member, thereby preventing upward movement of the spring member.

In a preferred embodiment, the apertures in the suspension conduit are omitted and, in their place a pair of arcuately-shaped, upwardly-extending spring retainers, being resiliently, outwardly biased are diametrically positioned about the conduit and means is provided for suitable securing the retainers thereto.

DESCRIPTION OF PREFERRED EMBODIMENTS

Figure 1:
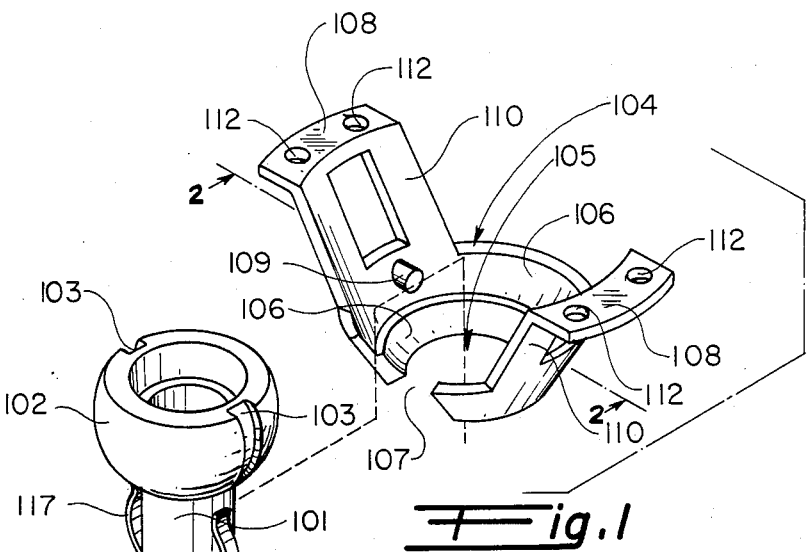
FIG. 1 is a perspective view of the swivel canopy have parts removed therefrom for the sake of clarity.
Figure 2:
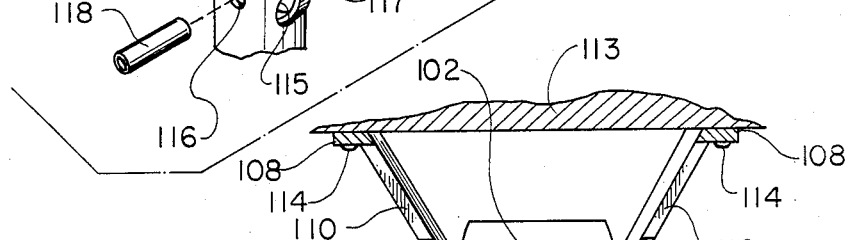
FIG. 2 is a longitudinal, partial cross-sectional view taken along lines 2—2 of FIG. 1.
Figure 3:
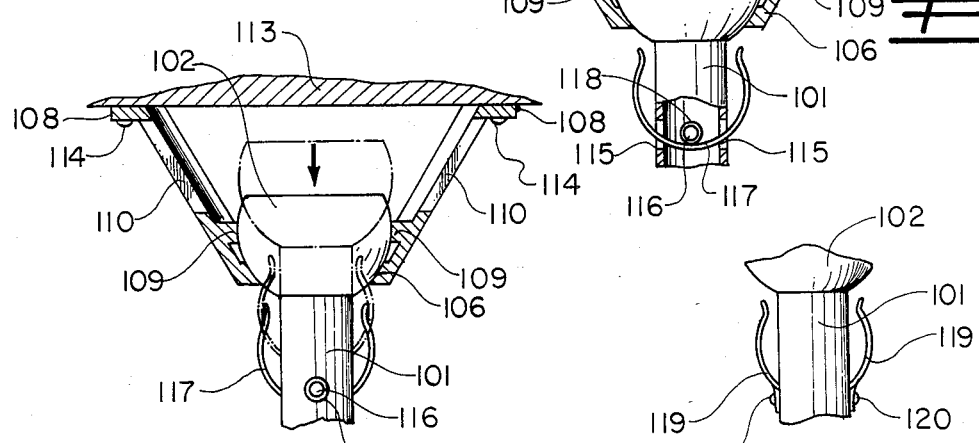
FIG. 3 is another longitudinal, partial cross-sectional view taken along lines 2—2 of FIG. 1, illustrating the manner in which the canopy is tested.

Referring now to the drawings, in FIGS. 1-3, the swivel canopy is provided with a suspension bearing retainer 104. The suspension retainer 104 includes flanges 108. As illustrated, flanges 108 are provided having apertures 112 formed therethrough. The canopy is secured to the ceiling 113 by a plurality screws 114 which are disposed through said apertures 112 (FIGS. 2 and 3). It will however be understood by those skilled in the art that any suitable means for securing the canopy to the ceiling may be employed.

Converging downwardly from the flanges 108 are converging legs 110. The lower ends of legs 110 are joined to a spherical retaining surface 106 having a side slot 107 formed therein. The bore 105 of retaining surface 106 defines the zone of a sphere. Finally, a pair of keys or trunions 109, each being substantially circular in shape, are provided. Said keys 109 are diametrically positioned about bore 105 being substantially aligned with the center of gravity (See FIGS. 2 and 3) of the swivel ball 102 when it is mounted, in a manner that shall be hereinafter discussed.

The spherical retaining surface 106 receives a swivel ball (spherical bearing) 102. The swivel ball 102 is preferably hollow and has a spherical outer face of somewhat greater extent than a hemisphere. The swivel ball 102 is formed having a pair of keyways (grooves) 103. Said keyways 103 are diametrically positioned about the swivel ball 102. When mounted, as shall be discussed, the keyways 103 cooperate with the keys 109. The swivel ball 102 is carried by the upper portion of a hollow suspension conduit 101. Preferably, the swivel ball 102 is internally threaded and the upper portion of the suspension conduit 101 is also threaded for threading engagement therebetween.

The suspension conduit 101 is provided having a pair of apertures 115 formed therein. Said apertures 115 are diametrically positioned about the conduit 101 in substantial horizontal alignment with one another. A third aperture 116 is formed in the conduit 101. A third aperture 116 is positioned substantially equidistantly between the pair of diametrically opposed apertures 115 on a plane being substantially horizontal therewith.

A substantially U-shaped spring member 117 having a first end and a second end is disposed through apertures 115 internally intersecting the conduit 101. Positioned thusly, said spring member 117 emerges from either side of conduit 101 via a respective aperture 115. Upon emerging via aperture 115, the two ends of spring member 117 extend upwardly in a direction towards the ceiling 113. Said spring member 117 is resilient being biased in an outwardly direction from the suspension conduit 101.

A substantially circular roll pin 118 is horizontally disposed through the third aperture 116 and is received within the conduit 101. Disposed thusly, said pin 118 is positioned substantially above the spring member 117, thereby preventing upward movement of said spring member 117 in the conduit and retaining said spring member 117 in place.

The lower portion of suspension conduit 101 is adapted to be connected to any electrical fixture which is desired to be suspended from the swivel ball 102 and the suspension retainer 104. The side slot 107 is dimensioned to allow the suspension conduit 101 to pass therethrough so that, after the suspension retainer 104 is installed, the swivel ball 102 and the suspension conduit 101 may be slipped into or out of the retaining surface 106 through the side slot 107.

As perhaps best seen in FIGS. 2 and 3, when mounted, any wires needed for connection to an electrical outlet are disposed through the swivel ball 102 and the suspension conduit 101 before insertion of the swivel ball 102 in the retaining surface 106. The swivel ball 102 is assembled in the retaining surface 106 by raising the swivel ball 102 and its attached conduit 101 to clear the retaining surface 106. Said ball 102 and conduit 101 are then moved laterally so that the conduit 101 enters through the side slot 107. It will be noted that the legs 110 are sufficiently shaped so as to permit passage of the swivel ball 102.

The ball 102 and the conduit 101 are then moved vertically downwardly until the respective ends of the resilient spring member 117 engage the retaining surface 106 and the outward biasing action of said member 117 prevents further downward movement therein. Application of further downward force overcomes the outward biasing action of the respective ends of the spring member 117 forcing the said resilient ends towards the suspension conduit 101 (FIG. 3). Continued application of this downward force permits the spring member 117 to eventually clear the retaining surface 106. Once the spring member 117 clears said surface 106 the resilient biasing action returns the spring member 117 to its original position (FIGS. 2 and 3) and permits location of the swivel ball 102 within the retaining surface 106.

This contact between the retaining surface 106 and the spring member 117 creates downward pressure on the bearing retainer 104. This pressure is utilized to test the installation of the said bearing retainer 104 to the ceiling 113 to insure that it has been properly installed so that it will supply the requisite support and stability during use thereof. If this force dislodges or loosens the retainer 104 from the ceiling 113, the necessary adjustments and reconnections may be made.

After locating the swivel ball 102 within the retaining surface 106, the ball 102 turned until the keyways 103 engage the keys 109. When so positioned, the keys 109 engage the keyways 103 at the center of gravity of the swivel ball 102. Mounted in this manner, with the key 109 engaging the keyway 103 at the center of gravity, and by utilization of a substantially circular key 109, the swivel ball 102 may pivot about a plurality of axes transverse to the suspension conduit 101, but it cannot rotate about an axis of the conduit 101. In this fashion, the electrical wires extending therethrough will not become twisted.

It should also be noted that, positioned thusly, the swivel ball 102 is engaged and is substantially hemispherically supported by both the retaining surface 106 and the keys 109, thereby allowing the swivel canopy to provide additional structural support.

Figure 4:
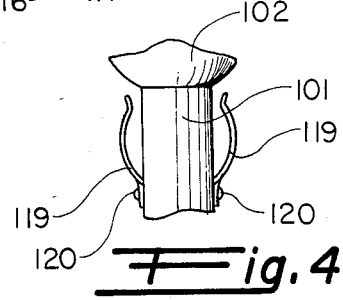
FIG. 4 is a partial view of another embodiment of the suspension conduit of the present invention.

In another embodiment as seen in FIG. 4, apertures 115 and 116 formed in the suspension conduit 101, as well as the roll pin 116 and the U-shaped spring member 117 as described above with reference to FIGS. 1-3, may be eliminated. In their place a pair of upwardly extending arcuately-shaped spring retainers 119 can be provided. Said retainers 119 are diametrically positioned about the conduit 101 and are resiliently biased in an outwardly direction. Said retainers 119, as illustrated, are secured to the conduit 101 by screws 120. However, as well be understood by those skilled in the art, any suitable means to secure the retainers 119 to the conduit 101 may be utilized. Positioned thusly, said retainers operate in the same manner as the spring member 117 described above.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In a swivel canopy for hanging electrical fixtures of the type having
   at least two upper mounting flanges;
   means for securing said mounting flanges to a ceiling;
   at least two downwardly converging legs, each leg having an upper portion being integral with one of the flanges and each leg further having a lower portion;
   a spherical retaining surface being integral with the lower portion of said legs, said surface having a vertical bore formed therethrough defining the zone of a sphere;
   a swivel member having at least one keyway formed thereon, said swivel member being supported at the inner periphery of the spherical retaining surface;
   at least one key formed on the retaining surface for cooperating with the keyway, said key being substantially circular in shape and being positioned on the retaining surface contacting the center of gravity of the swivel ball, wherein the swivel ball is substantially hemispherically supported by the key and the retaining surface, whereby additional structure support is provided; and a hollow suspension conduit having an upper portion being suitably secured to the swivel member and a lower portion for supporting an electrical fixture thereon for suspension below the retaining surface;

the improvement thereupon comprising:

said suspension conduit further having a first and a second aperture formed therein, said apertures being positioned diametrically on the conduit in substantial horizontal alignment with one another;

a substantially U-shaped resiliently, outwardly biased spring member having a first end and a second end, said spring member being disposed through each of said apertures so that said first end and said second end emerge from a respective aperture and extend upwardly therefrom towards the ceiling;

said suspension conduit further having a third aperture being formed therein, said third aperture being equidistantly positioned between the first and second apertures on a substantially common horizontal plane therewith; and a roll pin horizontally disposed through the third aperture and being received within the conduit in a position above the spring member, thereby preventing upward movement of the spring member;

wherein, during installation of the suspension conduit in the bearing retainer the spring member resiliently engages the retaining surface creating force, whereby proper installation of the bearing retainer to the ceiling may be tested to insure its proper installation so that adequate support and stability is provided.

2. In a swivel canopy for hanging electrical fixtures of the type having at least two upper mounting flanges;

means for securing said mounting flanges to a ceiling;

at least two downwardly converging legs, each leg having an upper portion being integral with one of the flanges and each leg further having a lower portion;

a spherical retaining surface being integral with the lower portion of said legs, said surface having a vertical bore formed therethrough defining the zone of a sphere;

a swivel member having at least one keyway formed thereon, said swivel member being supported at the inner periphery of the spherical retaining surface;

at least one key formed on the retaining surface for cooperating with the keyway, said key being substantially circular in shape and being positioned on the retaining surface contacting the center of gravity of the swivel ball, wherein the swivel ball is substantially hemispherically supported by the key and the retaining surface, whereby additional structural support is provided; and a hollow suspension conduit having an upper portion being suitably secured to the swivel member and a lower portion for supporting an electrical fixture thereon for suspension below the retaining surface;

the improvements thereupon comprising:

said suspension conduit further having a first and a second identical, arcuately shaped, upward-extending spring retainers being diametrically positioned thereon, said spring retainers being resiliently biased in an outwardly direction from the conduit; and means for suitably securing the spring retainers to the outside of the hollow suspension conduit with minimum penetration of the space within the hollow suspension conduit, said penetration being at the inner surface of said suspension conduit;

wherein, during installation of the suspension conduit in the bearing retainer, the spring retainers resiliently engage the retaining surface creating force, whereby proper installation of the bearing retainer to the ceiling may be tested to insure its proper installation so that adequate support and stability are provided.

* * * * *